Oct. 25, 1938.   U. C. TAINTON   2,134,457
METAL TREATMENT
Filed March 2, 1937    2 Sheets-Sheet 1
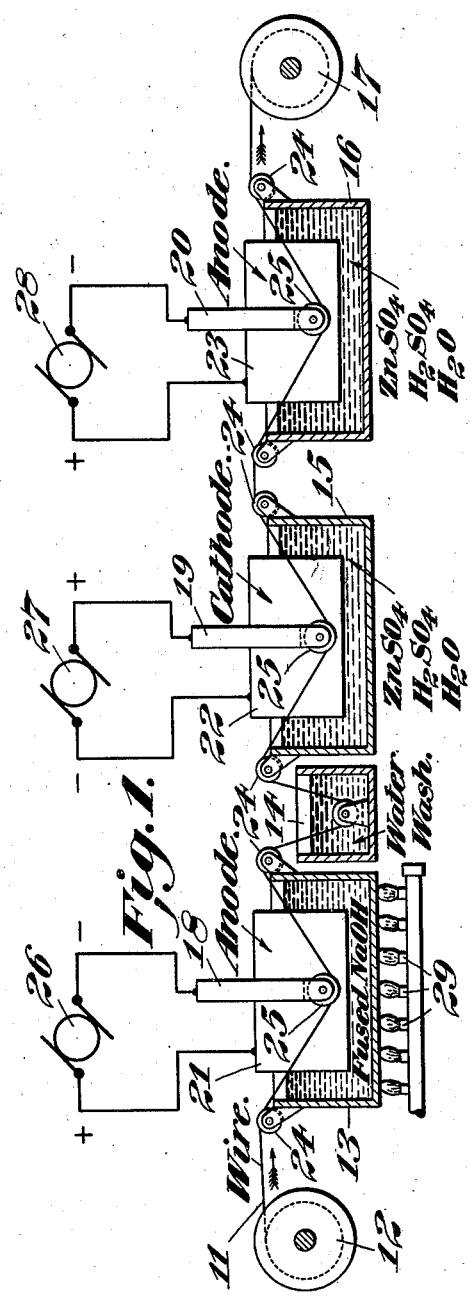
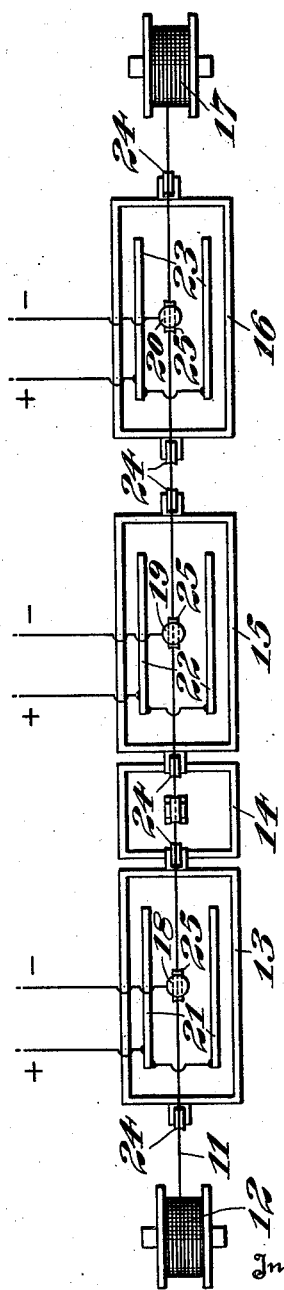
Inventor
Urlyn Clifton Tainton.
By R. S. C. Dougherty.
Attorney

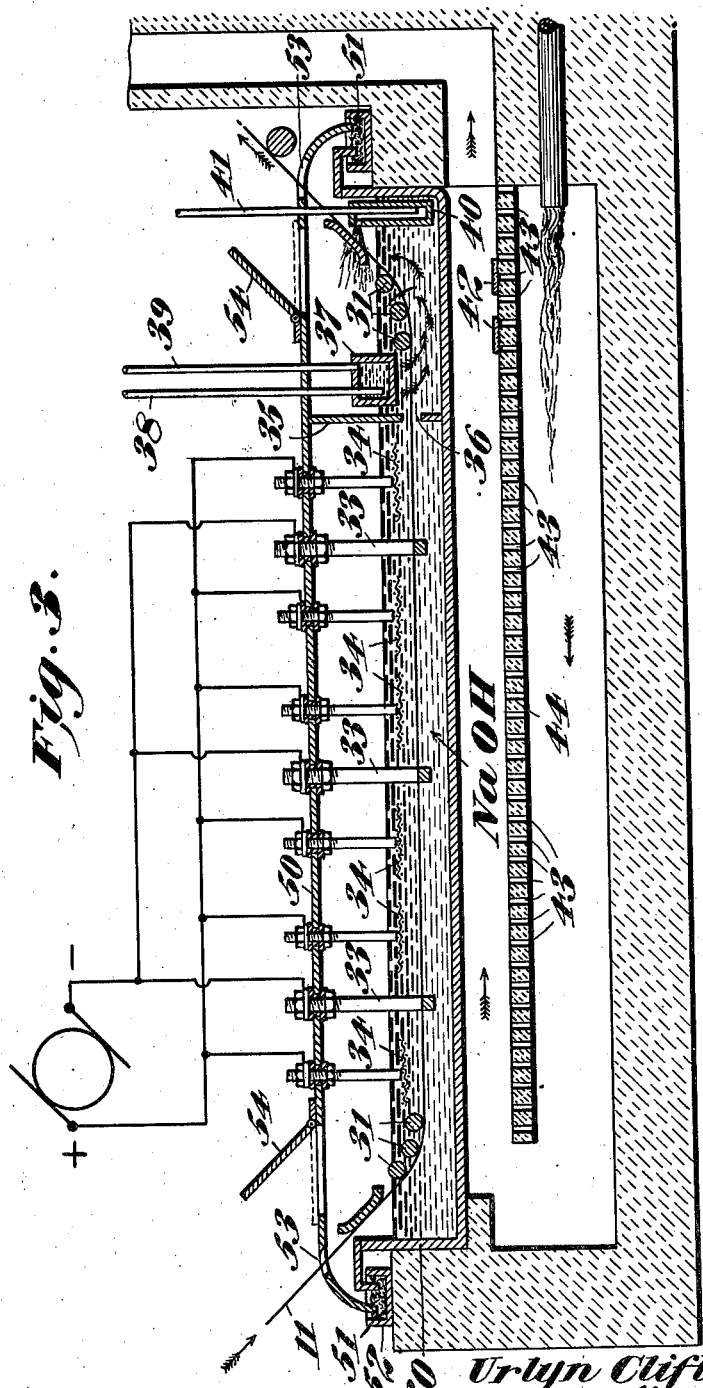

Patented Oct. 25, 1938

2,134,457

UNITED STATES PATENT OFFICE 2,134,457

METAL TREATMENT

Urlyn Clifton Tainton, Baltimore, Md.

Application March 2, 1937, Serial No. 128,632

21 Claims. (Cl. 204—19)

My invention relates to the treatment of metal, particularly for the cleaning of the surface thereof. The invention is especially effective for removing rust, scale, carbon and slag from the surface of iron and steel, and is particularly applicable as a preliminary treatment to various coating operations, such as galvanizing, enameling, painting, electroplating or the like. The invention, however, as will later more fully appear, is not limited to the treatment of ferrous metal.

This application is a continuation-in-part of my applications Serial No. 630,233 and Serial No. 692,378, filed August 24, 1932, and October 6, 1933, respectively.

My invention comprises the step of subjecting the surfaces of metals to the reducing action of a metal more electropositive than the metal being treated. For example, when iron or steel is being treated it may be subjected to the action of sodium or calcium, which metals are considerably more electropositive than iron.

More specifically, my invention comprises the subjection of the metal article to be treated to the action of a more electropositive metal by a method in which the article is used as a cathode in a bath comprising compounds of the more electropositive metals, under such conditions that the more electropositive metal is liberated at the surface of the article.

In presenting this invention, a specific embodiment thereof will first be described, followed by illustrative modifications and an outline of the general principles upon which it rests.

Accordingly I shall first describe the cleaning of steel or iron wire as a step in the manufacture of electroplated zinc coated wire.

Referring to the drawings:

Fig. 1 is a diagrammatic elevation, more or less in section, of a system for cleaning and electroplating the wire;

Fig. 2 is a plan view of the same; and

Fig. 3 is a diagrammatic elevation of a wire cleaning tank for effecting a modification of the cleaning process carried out in the system shown in Figs. 1 and 2.

Referring first to Figs. 1 and 2, the wire 11 is fed continuously from reel 12 successively through cleaning tank 13, wash tank 14, anodic cleaning tank 15, and electroplating tank 16, to reel 17. Electrodes 18, 19 and 20 depend into tanks 13, 15 and 16 which also contain electrodes 21, 22 and 23, respectively. The wire runs over guide rolls 24 mounted on the tanks, and over guide rolls 25 mounted at the ends of electrodes 18, 19 and 20. The electrodes of the several tanks are connected to electric current sources 26, 27 and 28, respectively, electrodes 18, 19 and 20 being respectively negative, positive, and negative, while electrodes 21, 22 and 23 are respectively positive, negative and positive. Guide rolls 25 serve to conduct current to wire 11, the wire thus being rendered cathodic in tank 13, anodic in tank 15 and again cathodic in tank 16. Gas burners 29 are provided for maintaining tank 13 in a heated condition.

Tank 13 contains a fused bath of sodium hydroxide through which the wire passes. Current is passed through the fused bath to electrolyze it, the wire serving as the cathode. In this specific example of my invention, the wire passes through the bath at such a rate that each portion thereof remains immersed in the fused bath for a period of about thirty seconds and the current density employed is between 100 and 200 amperes per square foot of cathodic surface.

From tank 13 the wire passes through wash water in tank 14 to remove the adherent sodium hydroxide, thence passing through an aqueous solution of sulphuric acid in tank 15, the concentration of this being 20% $H_2SO_4$. Here the wire acts as the anode, the current density employed being of the order of 100 amperes per square foot or greater.

The wire next passes through an aqueous solution of zinc sulphate and sulphuric acid in tank 16, the zinc sulphate being in such an amount as to give a zinc content of 7 grams per 100 cubic centimeters of solution and the sulphuric acid about 20%. Here the wire acts as the cathode, the current density being of the order of 200 amperes or greater per square foot of cathodic surface. Here the wire is electroplated with zinc. For the anodic treatment in tank 15, the same composition may be employed as that in the coating or plating tank 16.

The anodic treatment of the wire in tank 15 may be effected with an electrolyte of substantially the same composition as the plating electrolyte in tank 16. It is to be understood, of course, that the most significant constituent of this electrolyte used in tank 15 is the sulphuric acid.

The treatment in tank 13 is the most significant stage of the process so far as this particular case is concerned and no claim is made herein to the treatments in tanks 15 and 16. This treatment in tank 13 effectively cleans the surface of the wire, fully removing those obstacles to effective coating of ferrous metal. Moreover this treatment produces a "passive" condition of the surface of the metal. This passivity of the metal surface gives it a considerable degree of resistance to corrosive influences.

Current densities in this sodium hydroxide-cathodic cleaning operation may vary over substantial ranges. However, sufficient current density and a sufficient period of time of the metal in the cleaning bath should ordinarily be employed to effect a substantially complete reduction of surface oxides while the metal is in the bath. Ordinarily the current density should be between 25 and 300 amperes per square foot of cathode surface. Most commonly the current is from 100 to 200 amperes per square foot of cathode surface.

While wire has just been given as an example of an article which may be advantageously treated by the process just described, it is evident that metal articles generally may be treated by the cathodic cleaning operation in fused sodium hydroxide whether the articles are to be fed continuously through the fused bath, as in the case of wire, or are to be treated intermittently. Obviously the application of the cathodic, fused bath treatment is not limited to articles which are to be zinc coated as in the specific illustration just given. The method is applicable wherever it is desired to obtain an effectively cleaned metal surface. This type of cleaning is especially effective as a preparation of metal surfaces for subsequent coating operations, whether electrolytic or otherwise, including enameling and the like, but its application is as wide as the need for effectively cleaned metal surfaces.

The cleaning effect produced by the process set forth above is due to the reducing action of the elemental sodium on the compounds, such as oxides, on the surface of the iron or steel being treated, the sodium being liberated in the elemental condition during electrolysis of the fused bath. The reducing action of the sodium on the iron and other oxides is enhanced by the nascent state of the electrolytically separated metal.

For the most effective results, the electrolysis of the fused sodium hydroxide should be so carried out that the elemental sodium liberated does not collect in sensible amounts, preferably not in visible amounts, upon the article being treated and which article acts as cathode during the electrolysis. To effect this result, I employ conditions during electrolysis such that the sodium as fast as it is separated from the sodium hydroxide, in the elemental state, is dissolved by or diffused into the bath of sodium hydroxide, and consequently does not gather or collect upon the surface of the article acting as cathode.

Under such conditions the sodium acts in two ways upon the oxides and other compounds on the article's surface: firstly, the sodium acts reducingly at the instant of its liberation from the sodium hydroxide, that is, it acts in its nascent condition; and secondly, the article is bathed by a solution of sodium in sodium hydroxide which acts reducingly upon any compounds on the article's surface.

If conditions were to be used which would cause the collection of sensible amounts of sodium on the cathode, as is done in the known processes for electrolytic recovery of metallic sodium, the action of the sodium upon the article being treated would not be so effective as when the procedure just outlined is followed. If sodium is deposited in sensible amounts upon the cathode article, it is practically impossible to get uniform reduction of the oxides and other compounds upon its surface. The sodium collects irregularly upon the cathode surface, appearing as globules here and there, and as soon as a portion of the cathode surface receives a film of sodium, the rate and depth of reduction in that portion is immediately diminished because the collected sodium is not so effective a reducing agent as nascent sodium or sodium in solution, and since the film protects the surface from the direct action of nascent and dissolved sodium. Moreover, the conditions necessary for depositing sodium in sensible amounts upon the cathode are such that the sodium hydroxide surrounding the article being treated contains little, if any, sodium in solution. Consequently even those portions of the article's surface which are not covered by a film of sodium are not so quickly and effectively subjected to the action of the sodium.

Another factor which would interfere with getting the best results, when sodium is deposited in sensible amounts upon the article, is that of reoxidation. As just stated above, the sodium tends to gather more or less irregularly upon the cathode surface. Elemental sodium rapidly forms oxides when brought into the air, the oxides of sodium being very powerful oxidizing agents. When a ferrous or other metal article, having globules of sodium upon its surface emerges from the fused bath, oxides of sodium are quickly formed which immediately reoxidize portions of the article's surface.

The most easily imposed conditions for effecting the treatment with sodium without collecting sensible quantities of sodium on the surface of the article being treated is by control of the temperature of the fused bath of sodium hydroxide. I maintain this fused bath at a temperature above that at which sodium collects upon the cathode. By keeping the bath at temperatures more than 20° C. in excess of the melting point of sodium hydroxide, the sodium is prevented from collecting on the cathode. At such temperatures the liberated sodium, which does not act immediately upon the compounds on the cathode surface, dissolves forthwith in the sodium hydroxide and thus the article being treated is surrounded with a highly reducing liquid which is exceedingly effective in rapidly reducing the compounds which may be upon the surface.

Preferably I employ the sodium hydroxide bath at a minimum temperature of 350° C., but, as implied above, I may go as low as a temperature just in excess of 20° above the melting point of the sodium hydroxide. Consequently I may use a temperature as low as just in excess of 338° C. in the case of pure sodium hydroxide. Since most commercial sodium hydroxides are more or less impure, their melting points are lower than that of the pure hydroxide, ordinarily ranging from about 295° C. to 300° C., consequently with these impure sodium hydroxides I may operate at somewhat lower temperatures, if desirable, namely at temperatures which are just in excess of 315° to 320° C.

Thus far we have considered the minimum temperature at which the fused bath of sodium hydroxide is used. It is frequently desirable to operate at fairly high temperatures and this may be successfully done. The fused bath may combine the function of annealing the metal articles with that of its cleaning action thereon. Steel wire, for example, is commonly produced by being "cold drawn" which operation introduces more or less stresses or strains. By operating the fused bath at a sufficiently elevated temperature these conditions may be entirely relieved. With this additional function of annealing, or for that matter any desired form of heat treatment, the fused bath will be used at temperatures best adapted to the particular material and purpose involved.

High chromium steels, including the so-called "stainless steels" such as the well known "18-8" (18% chromium, and 8% nickel), are advantageously treated by my cleaning process. In treating these high chromium steels it is usually well to employ temperatures of the order of 538° C.

A very important aspect of my invention relates to the control of conditions to avoid or nullify the disadvantage of reoxidation of the surface of the metal being treated. I have discovered that unless certain precautions are taken the metal quickly oxidizes upon removal from the cleaning and deoxidizing bath. If, in the operation of the process given above as an example of my invention, the bath of sodium hydroxide is maintained at a temperature substantially above 550° C., the surface of the iron or steel becomes oxidized when it passes from the fused sodium hydroxide in tank 13 into the air. This condition can frequently be obviated by maintaining the fused bath of sodium hydroxide at a temperature below 550° C., at 500° C., for example. By using the cleaning bath at this temperature the oxidation of the treated metal is usually avoided by preventing at the outset the condition of the steel surface which leads to oxidation. As will be apparent later in this specification, it is feasible under certain circumstances to operate the fused cleaning bath at temperatures which normally render the metal easily oxidizable and then to subject the metal being treated immediately to conditions which will overcome the tendency to oxidize.

The causes of this ready oxidability of the metal after leaving the fused bath are somewhat obscure, but it appears that under certain conditions, as when the temperature of the bath is higher than a particular temperature, (550° C. in the case of NaOH), the metal while in the bath, or possibly as it leaves the bath, becomes covered with active oxidizing agents. As long as the metal being treated is performing the function of cathode these oxidizing agents are of no effect, but when the metal passes into the atmosphere, these oxidizing agents become active. I do not wish to be limited in my patent protection by any particular explanation of these phenomena.

In carrying out the process above described, it may be useful in some cases to employ temperatures of the fused bath in excess of 550° C. It may be desired, for example, to effect an annealing of wire in the fused bath at a temperature say of 600° C. If such a temperature of the fused bath is employed in tank 13 the surface of the wire will oxidize when it enters the air. The oxides on the surface, thus produced, however, are not so closely adherent as those which normally occur on ferrous surfaces and they may easily be removed by a relatively mild pickling operation in an aqueous acid bath, such a pickling operation being much more easily and inexpensively carried out than if the metal had not previously been subjected to the fused bath, treatment. Of course, when the article, after its treatment in the sodium hydroxide bath, is given a treatment such as the anodic treatment illustrated in Figs. 1 and 2, the oxides are effectively removed.

But while it is practicable to thus remove the oxides formed on the wire or other metal I prefer in most cases to proceed in such manner as to prevent their occurrence. In the process involving the anodic treatment the removal of the oxides by the anodic operation has a disadvantage in that to effect their complete removal it is usually necessary to prolong the anodic treatment thus slowing up the entire process. Accordingly when I employ such temperatures of the fused bath as produce the tendency to ready oxidability I find it advantageous to use some form of procedure which will nullify this tendency.

In Fig. 3 I show means for carrying out a process in which this tendency is overcome. The cleaning tank 30 contains a fused bath of sodium hydroxide. Wire, for example, 11 is fed continuously through this bath, passing under guide rods 31 at the entry and exit ends thereof and being engaged at intervals within the bath by the lower portions of electrodes 33 which, being negative, render the wire cathodic. Nickel anodes 34 are provided at intervals along the length of the tank. The sodium hydroxide bath is divided into two portions by partition 35 which has an opening 36 through which wire 11 passes. This partition is placed nearer the exit end than the entry end, the portion of the fused bath at the exit end thus being smaller than that at the entry end.

To the right of partition 31, as viewed in Fig. 3, a cooling box 37 is provided which is immersed in the sodium hydroxide bath, its lower surface being located somewhat above the path of wire 11. Box 37 is placed relatively near to partition 35. Cooling water is fed into box 37 through pipe 38 and passes out through pipe 39. The liquid sodium hydroxide adjacent box 37 is cooled and falls to the lower part of the tank, the hotter hydroxide flowing in to take its place, a circulation of the bath to the right of the partition thus being produced as indicated by the arrows in Fig. 3. By these means the portion of the bath at the exit end of the tank is maintained at a considerably lower temperature than that portion of the bath at the entry end to the left of the partition.

In place of or in addition to the means just described for controlling the temperature of the exit end of the bath I may employ a type of furnace for heating the pot which permits concentration of heat at the input end and allows the temperature at the exit end to remain considerably lower. Thus in Fig. 3 I have shown stoppers 42 of sheet refractory material placed over some of the openings 43 in the fire brick arch 44 over which the pot is mounted. By this device the proportion of combustion gas which passes through the arch at the exit end is reduced and the temperature of the exit end of the pot is reduced accordingly.

By these means it is feasible to maintain the bath to the left of the partition at a desired temperature above 550° C., say 600° C. and the portion to the right of the partition at a desired temperature less than 550° C., say 500° C. It is possible to secure the combined annealing and cleaning in the higher temperature portion of the bath, and by passing the wire or other metal article through the lower temperature portion to overcome to a very substantial degree the tendency of the metal to reoxidize. In other words while the treatment to the left of the partition by itself would give the metal a tendency to oxidize if it were then removed from the bath the treatment to the right of the partition, at the lower temperature, largely overcomes this tendency.

Other means for overcoming or nullifying the tendency to oxidation of the metal may be employed. Referring to Fig. 3, a box 40 is located near the exit end of tank 30 into which a pipe 41 discharges steam near the bottom. Near the top of box 40, on the side opposite the exit end of the tank, is an opening adapted to discharge a stream of steam across the surface of the fused bath and also across the wire as it issues from the fused bath. Box 40 serves to catch any water in the liquid state which may be entrained by the steam and therefore the steam which issues from the box and passes across the wire and the fused bath is substantially free from liquid water.

Treating the wire in this manner likewise obviates or nullifies the tendency of the wire surface to reoxidize. I believe that this tendency of the metal to oxidize rapidly upon removal from the fused bath is due to the presence of actively oxidizing substances upon its surface. The $H_2O$, furnished in the form of steam, is believed to combine with these substances to render them non-oxidizing. It is likely that at high temperatures, temperatures above 550° C., $Na_2O$ is formed in the bath which is carried away on the surface of the wire. When $H_2O$ is brought in contact with the $Na_2O$ it combines therewith to reform NaOH thus transforming an active oxidizing agent into one which is practically non-oxidizing. However, as I have already indicated, I do not wish to limit my protection by any theory as to what may occur.

The steam seems to have an action in addition to that which it directly effects upon the wire as it issues from the fused bath. It appears to modify somewhat the character of the bath with which it contacts in that it adds a small amount of $H_2O$ to the bath which combines with the oxidizing materials therein and thereby renders the exit portion of the bath relatively free from the tendency to furnish actively oxidizing materials to the wire or other metal article.

While the several modes of overcoming the tendency of the metal to oxidize above described may be used alternatively, they may be used in conjunction as shown in the figure.

In this connection it may be well to call attention to the agitation of the fused bath in the exit portion of the tank due to the circulation of this portion of the bath. I have discovered that agitation of the fused bath serves to overcome the tendency of the metal to oxidize. Even in the absence of means for cooling the exit portion of the bath and of the treatment of the metal and bath with steam, the tendency to oxidation may be substantially or even completely overcome if the fused bath is sufficiently agitated.

Other means for preventing the rapid oxidation of the metal as it leaves the fused cleaning bath may be employed. The oxygen in the air appears to be a factor in the reoxidation of the metal as it leaves the fused bath. By providing an atmosphere of a non-oxidizing gas, particularly one having a reducing action, reoxidation is substantially or entirely prevented.

Instead of working with the higher temperatures of the bath which give the tendency to active oxidation, it is of course practicable to employ the lower temperatures and effect an annealing by previously passing the wire or other article through a lead bath or other suitable medium at the appropriate annealing temperatures.

My process is not limited in its application to sodium hydroxide. Other compounds of sodium may be used, or mixtures of different compounds. Nor is my process limited to the use of compounds of sodium. Compounds of the other alkali metals may be used, those of potassium being particularly suitable. I may also use compounds of the alkaline earth metal group including magnesium, those of calcium being economically advantageous. Hereafter, when referring generically to these various metals and their compounds, I shall usually designate them as "highly electropositive metals" or compounds thereof.

Not only with sodium hydroxide but with other compounds of sodium as well as compounds of the other metals of the alkali metal group the metals of the alkaline earth group, I prefer to operate at temperatures substantially above their melting points. I find that the reducing action of these highly electropositive metals is much more effective if the operating temperature of the bath is substantially in excess of the melting point of the compound or mixture of compounds which is used. Ordinarily the operating temperature of the bath should be in excess of twenty degrees above the melting point of the bath. By so proceeding, I find that I avoid the superficial reduction of compounds which may occur if lower temperatures are used, moreover the resulting reduced metal is much more easily detached than if the lower temperatures were to be used.

By selection of the proper compound for the fused bath or by a mixture of compounds, a wide variety of effects may be produced, thus enabling one to select the conditions most suitable for his particular material and problem. For example, if lower temperatures of operation, than those securable by the use of sodium hydroxide, are desired, such temperatures can be obtained by the use of compounds of lower melting points, such, for example, as sodium nitrite, (fusing at 213° C.), either alone or mixed with sodium hydroxide. By the judicious mixing of various sodium and potassium salts, as is well known, a rather wide range of fusion points may be secured.

It will be obvious to the electro-chemist that the working conditions must frequently be altered with a change in the character of the fused bath employed. If a chloride of a highly electro-positive metal were to be used, for example, it would be necessary that the anodes used should be of some material resistant to the action of chlorine.

Usually in carrying out my cleaning operation it is important to maintain the fused bath relatively constant in composition or at least to allow variations only within definite limits. If there is undue variation in the composition of the fused bath the temperature will vary unduly. If, for example, sodium hydroxide is used for the bath undue formation of sodium carbonate through absorption from the air of carbon dioxide will lead to such an elevation of the melting point of the bath as to give bath temperatures too high for the most satisfactory operation of my process. Where, for instance, it is desired to operate the bath of sodium hydroxide at a temperature below 550° C. to prevent the ready oxidability of the metal, it is necessary that means be provided to prevent the absorption of such an amount of carbon dioxide as will raise the melting point above the desired operating temperature. The carbonate content of the fused bath will of course depend upon the rate of removal of the mixture of sodium hydroxide and sodium carbonate upon the surface of the metal being treated, the rate of replenishment of the fused bath by the addition of pure sodium hydroxide, and the rate of absorption of carbon dioxide. The most effective way of keeping the carbon dioxide absorption at the necessary minimum is by providing a cover for the fused bath cleaning tank.

Referring to Fig. 3, tank 30 is provided with cover 50, the edges of which rest in a lime seal 51 disposed in trough 52 which surrounds the tank. This cover is provided with openings 53 through which wire 11 passes into and out of the tank. Cover 50 is also provided with doors 54 through which easy access is had to different portions of the tank without removal of the cover.

The loss of sodium hydroxide, or other bath constituent, from the fused bath, due to its being carried away on the surface of the article treated, may be minimized in various ways as by wiping the wire or other article as it issued from the bath. Sheets, for example, may be passed between rollers arranged adjacent the exit end of the bath. In the example shown in Fig. 3 the stream of steam employed at the exit end of the bath acts to blow off considerable of the sodium hydroxide on the surface of the wire.

I have already indicated, in my description of the use of a fused bath of sodium hydroxide, that I prefer to operate the bath under such conditions that I obtain the conjoint action of sodium in the nascent state and sodium dissolved in the sodium hydroxide. The solution of the reducing metal is a highly important feature of my invention. A consequence of its presence is that reduction of oxides and other compounds is not limited to those portions of the article's surface which are acting efficiently as cathode. For example, the oxides on both sides of an article are reduced even when but one side of such article acts as cathode. The importance of this action of the solution of highly electro-positive metal is obvious. Many articles to be cleaned are of such shape that it is practically impossible for all parts of their surface to act efficiently as cathode surfaces, as, for example, articles of a tubular construction, those which are deeply recessed, and the like. As a result of the article being surrounded by a solution of the reducing metal, all portions of the article's surface can be effectively treated.

My process is not limited to the treatment of ferrous metals. Articles of various metals may be efficiently cleaned by subjecting them to the action of metals having a greater affinity for oxygen than the metal being treated.

For example, I have effectively cleaned articles of copper, bronze, and nickel-chromium alloys by using them as cathodes in the electrolysis of a fused bath of sodium hydroxide. It will be readily appreciated that the essential principles of this invention may be applied to metals generally, varying, as desired and as special conditions demand, the details of the operation.

Various modifications in my process are feasible. For example, it is practicable to produce alloy surfaces on an article at the same time it is treated to reduce oxides and other reducible compounds. For instance, it is possible to give copper a zinc-copper alloy surface by subjecting the copper as cathode to electrolysis in a fused bath of sodium hydroxide in which zinc oxide is dissolved, the copper not only being cleaned but the zinc being deposited to alloy with the surface of the copper. Similarly, the copper may be provided with a surface of a copper-tin alloy by subjecting the copper as cathode to electrolysis in a fused bath of sodium hydroxide in which tin oxide has been dissolved. Lead may be deposited upon ferrous surfaces if a lead compound is present in the fused bath.

My process may be effectively utilized to produce sponge metal. For example, my process is very effective in treating all ferrous material which has exceedingly heavy amounts of scale. When such material is subjected to my operation, as, for instance, when treated in a caustic soda bath, as above outlined, the sodium, both in the nascent form and in solution in the caustic soda, quickly and thoroughly reduces the heavy scale to sponge iron. This sponge iron cay be easily removed by well known operations, such as scraping, and by the use of water sprays. The sponge iron thus removed is an important industrial product and it is frequently economically advantageous to utilize such material where heavily oxidized material is treated on a large scale.

I have already indicated that the fused bath may be so used as to combine with its function of cleaning that of effecting the heating stage of heat treatments, such as annealing. These heat treatments are various. Many of them, such as most forms of normalizing include the step of heating the metal above the "critical temperature". The fused bath, which is used for cleaning the metal, may well be employed for the heating step of such heat treating operations. If the desired temperature is a very high one care should be taken to employ such a compound as will not react with the metal being treated at the elevated temperature. For example, I have found that in the combined heat treatment and cleaning of ferrous articles a mixture of 50% potassium chloride and 50% sodium carbonate may be used at considerably higher temperatures than sodium hydroxide.

Earlier in this specification I have referred to the tendency, under certain conditions, to reoxidation of the article's surface upon issuing from the fused bath, and I have set forth various ways to overcome this tendency. A further means of reducing or overcoming this tendency is to reduce the current density just before the article leaves the bath. For example, if wire is being treated in a caustic soda bath and a current density of 100 amperes per square foot of cathode surface is being employed to clean the surface, the current density may be reduced to 10 amperes or less per square foot of cathode surface just before the wire leaves the fused bath.

Having thus described my invention what I claim as new and desire to secure by Letters Patent is:

1. In a process of treating a metallic article to remove oxides, scale and the like, the steps of placing said article in circuit and subjecting it to electrolysis as a solid cathode in a bath of molten compound of a metal of the group consisting of the alkali and alkaline earth metals adapted to be liberated at the surface of the cathode in said electrolysis, said molten bath of the compound being at a temperature below the boiling point of the liberated metal and substantially in excess of the fusion point of the molten compound and sufficiently high to dissolve the liberated metal in said bath, and maintaining the article in said bath at said temperature for a sufficient time to remove said liberated metal at the surface of said cathode by solution in said bath and free said surface of oxides, scale and the like while the article is in the bath, and then delivering the treated article from said molten bath cleared of said oxides, scale and the like.

2. In a process of treating a metallic article to remove surface oxides, scale and the like, the steps of subjecting the article as a solid cathode to electrolysis in a fused bath of a compound of a metal of the group consisting of the alkali and alkaline earth metals maintained at a temperature below the boiling point of said metal and over 20° C. above the fusion point of said compound with a current density and for a time sufficient to effect a substantially complete reduction of surface oxides while the article is in the bath, and then delivering the article from said fused bath cleared of said oxides, scale and the like and substantially free from macroscopic amounts of a deposit of said metal on its surface.

3. The process of claim 2 in which the fused bath is of a compound of sodium maintained at a temperature between 350° C. and 750° C.

4. The process of claim 2 in which a compound of a metal alloyable with the metal of the article being treated is dissolved in the fused bath.

5. In a method of treating metal, the steps of subjecting the metal as a solid cathode to electrolysis in a fused bath of a compound of a metal of the group consisting of the alkali and alkaline earth metals adapted to be liberated at the surface of said cathode, said fused bath being maintained at a temperature below the boiling point of the metal of said compound and sufficiently high to dissolve the liberated metal in said bath and to form a solution of said metal in said bath, and continuing said treatment with sufficient current density for a time sufficient to clean the treated metal while in said bath by the combined liberation of the metal of the bath at the cathode and the bathing of the cathode in said solution of said metal in said compound, and delivering said treated metal from said bath free of oxides, scale and the like.

6. The method as set forth in claim 5 in which the treated metal is freed from actively oxidizing material before said metal is brought into the free atmosphere.

7. The method as set forth in claim 5 in which at least a portion of the fused bath is maintained at a temperature and moisture content preventing reoxidation of the surface of the metal being treated.

8. In a method of treating metal having an oxidized surface, the steps of subjecting the metal as a solid cathode to electrolysis in a fused bath of a compound of a metal of the group consisting of the alkali and alkaline earth metals with a current density and for a time sufficient to effect reduction of the oxides on the metal surface and clean the metal while in said bath, the temperature of the fused bath being more than 20° C. above the melting point of said compound but below the boiling point of the metal of said compound and below the temperature at which actively oxidizing materials are formed upon the surface of the metal, and then delivering the metal from said bath cleared of said oxides.

9. In a method of treating metal having an oxidized surface, the step of subjecting the metal as a solid cathode to electrolysis in a fused bath of sodium hydroxide at a temperature more than 20° C. above the melting point of said hydroxide and below the boiling point of sodium and with a current density and for a time sufficient to reduce substantially completely the metal oxides on the metal surface and clean the metal while the metal is in the bath.

10. In a method of treating metal having an oxidized surface, the step of subjecting the metal as a solid cathode to electrolysis in a fused bath of sodium hydroxide at a temperature more than 20° C. above the melting point of said hydroxide and below 550° C. and with a current density and for a time sufficient to reduce substantially completely the metal oxides on the metal surface and clean the metal while the metal is in the bath.

11. In a method of treating metal, the steps of subjecting the metal as a solid cathode to electrolysis in a fused bath of a compound of a metal of the group consisting of the alkali and alkaline earth metals at a temperature below the boiling point of said metal and substantially in excess of the fusion point of said compound and with a current density and for a time sufficient to effect a substantially complete reduction of surface oxides while the metal is in the bath, removing the metal from the bath with the surface of the metal cleaned of oxides, scale and the like and free of any macroscopic deposit of the metal of said compound, and immediately subjecting the metal to steam.

12. In a process of treating a metallic article having an oxidized surface, the steps of subjecting the article as a solid cathode to electrolysis in a fused bath comprising a compound of a metal of the group consisting of the alkali and alkaline earth metals, the temperature of the bath being such that the metal being liberated in the elemental condition at the cathode surface during electrolysis of the fused bath is dissolved into the bath as fast as it is liberated, continuing said treatment in said bath to effect substantially a complete reduction of the oxides on the metal surface and clean the article while the metal is in the bath, and effecting an agitation of at least a portion of the bath during electrolysis whereby the surface of the article is freed from substances tending to re-oxidize the surface of the article.

13. In a process of treating a metallic article, the steps of subjecting the article as a solid cathode to electrolysis in a fused bath of a compound of a metal of the group consisting of the alkali and alkaline earth metals adapted to be liberated at the cathode surface, said bath having a temperature below the boiling point of the metal of said compound and appreciably more than 20° C. in excess of the melting point of said fused bath, the metal being liberated in the elemental condition at the cathode surface during electrolysis of the fused bath and being dissolved into the bath as fast as it is liberated, and continuing said treatment at said temperature and with a current density and for a time sufficient to effect a substantially complete reduction of surface oxides while the metal is in the bath.

14. The method as set forth in claim 13 in which the article is delivered from the bath directly into an oxidation preventing atmosphere.

15. The method as set forth in claim 13 in which the temperature of the fused bath at the surface of the article is varied during said treatment.

16. The method as set forth in claim 13 in which the temperature of the fused bath at the surface of the article is relatively higher at the beginning of the treatment and is lowered before the article is delivered from the bath.

17. The method as set forth in claim 13 in which the article as it is delivered from the fused bath is subjected to treatment in a fluid reducing the tendency of the surface to oxidize.

18. The method as set forth in claim 13 in which the article as it is delivered from the fused bath is subjected to a current of fluid discharged along the surface of the article as it emerges from the bath and acting to reduce the oxidation at the surface of the material.

19. In a method of treating a metallic article, the steps of subjecting the article as a solid cathode to electrolysis in a fused bath of a compound of a metal of the group consisting of the alkali and alkaline earth metals at a temperature above 350° C. and below the boiling point of the metal of said compound and high enough in temperature to effect a heat treatment of the metal article being treated and with a current density and for a time sufficient to effect a substantially complete reduction of surface oxides while the article is in the bath.

20. In a method of treating a metal article, the step of subjecting the metal article as a solid cathode to electrolysis in a fused bath of a sodium compound with elemental sodium dissolved in it at a temperature above 338° C. and below the boiling point of sodium and with a current density and for a time sufficient to effect a substantially complete reduction of surface oxides while the metal is in the bath.

21. The method of claim 20 in which the sodium compound bath is at a temperature of above 350° C.

URLYN CLIFTON TAINTON.